United States Patent [19]
Fruchtnicht

[11] 3,870,018
[45] Mar. 11, 1975

[54] FISH GROWING TANK

[76] Inventor: Ernst August Fruchtnicht, Heidesee 28, 2138 Scheebel, Germany

[22] Filed: June 1, 1973

[21] Appl. No.: 365,968

[30] Foreign Application Priority Data
June 5, 1972  Germany.......................... 2227206

[52] U.S. Cl. ................................................ 119/3
[51] Int. Cl. .............................................. A01k 61/00
[58] Field of Search ........................... 119/2, 3, 4, 5

[56] References Cited
UNITED STATES PATENTS

| | | |
|---|---|---|
| 1,528,179 | 3/1925 | Baldridge................................ 119/3 |
| 2,690,158 | 9/1954 | Petty....................................... 119/3 |
| 3,166,043 | 1/1965 | Castillo................................... 119/3 |
| 3,716,025 | 2/1973 | Lawson................................... 119/3 |
| 3,724,423 | 4/1973 | Day et al. .............................. 119/4 |

*Primary Examiner*—Hugh R. Chamblee
*Attorney, Agent, or Firm*—Charles Hieken; Jerry Cohen

[57] ABSTRACT

A fish growing tank includes a tangentially directed sprinkler. A bottom evacuation hole is covered by a high removable latticed dome. A latticed feed table is provided free above the water level. The water volume is divided by several removable floors to form a multi-story tank.

15 Claims, 4 Drawing Figures

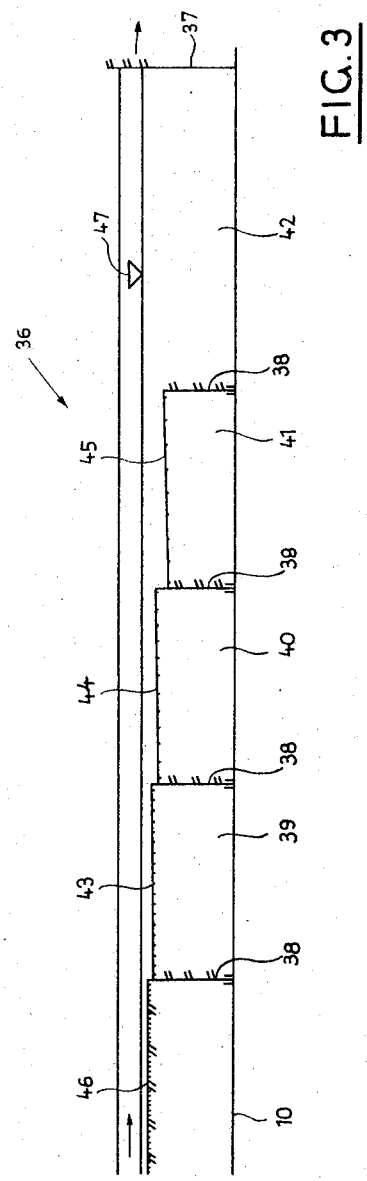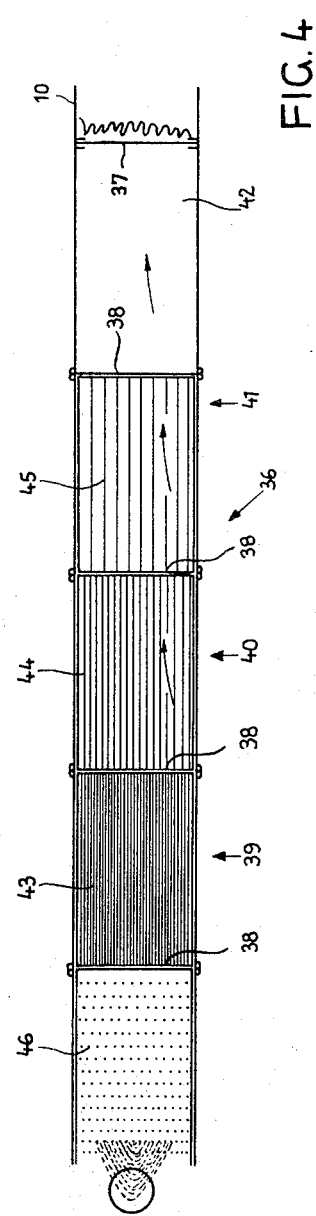

FISH GROWING TANK

BACKGROUND OF THE INVENTION

In the recent past some sorts of fish, e.g., carp and trout have been held in silo-like growing tanks. Such growing tanks, however, have not succeeded hitherto on account of unsatisfying operation and proportion of expense to profit.

It is an important object of the invention to provide a fish growing tank which ensures unobjectionable biological conditions and simultaneously economical operation.

SUMMARY OF THE INVENTION

The present invention is based on the consideration and observation that the operation in the known growing tanks is affected with irregular flow of water because the evacuation hole is subjected to uncontrolled variations of flow resistance by gathering of fish and deposits. In order to ensure a more regular flow of water it has been proposed to provide a water supply by an immersion tube whereas the evacuation of water takes place at the water surface. Such flow of water is unfavorable for living conditions of fish quite apart from the fact that settlings like dung, mud and residues of food are unsatisfactorily washed away.

These disadvantages are avoided according to the invention by provision of an evacuation hole in or near the bottom of the tank which is screened by a latticed dome of sufficient height to ensure an essentially free evacuation of water even if the evacuation hole is surrounded by fish and deposits. A spiral flow of water of predetermined volume downwards from the water surface to the evacuation dome may be maintained by sprinkling water onto the water surface in an inclined circumferential or tangential direction, thereby ensuring a good $O_2$-concentration.

Preferably the dome is movable away from the evacuation hole and the hole as well as the connected evacuation pipe are sufficiently wide to allow the fish to pass. Thus it is no longer necessary to fish off from above.

The evacuation hole may be connected to a run-like discharge channel including sorting means which preferably consist of a step grate with stepwise increasing widths and separated chambers for stepwise retaining fish of increasing size.

Especially for feeding trout a latticed feed-table may be provided in a preselected free distance above the water level which is supported, e.g., by swimmers. Such a feed-table can easily be observed which essentially facilitates production and maintenance of optimal biological conditions.

An essential improvement of growing tanks for trout and other bottom fish, e.g., flatfish and crustacea is obtained by providing one or more preferably replaceable floors which may consist of gratings and are connected to one or more wells extending from the bottom of the tank to the water level. Such a multi-story fish growing tank yields a multiplied utilization of water volume. Furthermore the concentrated filling makes it possible to use means for improvement of biological qualities with high effectiveness.

Preferably the floors are sloping against one or more of said wells so that dung, mud, weak and dead animals are removed automatically by the downwards directed water stream from said floors through one ore more wells to the evacuation hole. One of said wells may be provided above and by its lower part surrounding the dome with a free distance sufficient to allow dead animals to swim upwards to the water surface owing to the fact that their specific gravity is decreasing with beginning of decay.

The invention may be realized with relative flat or high silolike tanks.

BRIEF DESCRIPTION OF THE DRAWING

A preferred embodiment is shown in the accompanying drawing in which.

DETAILED DESCRIPTION OF A PREFERRED EMBODIMENT

Figure 1:
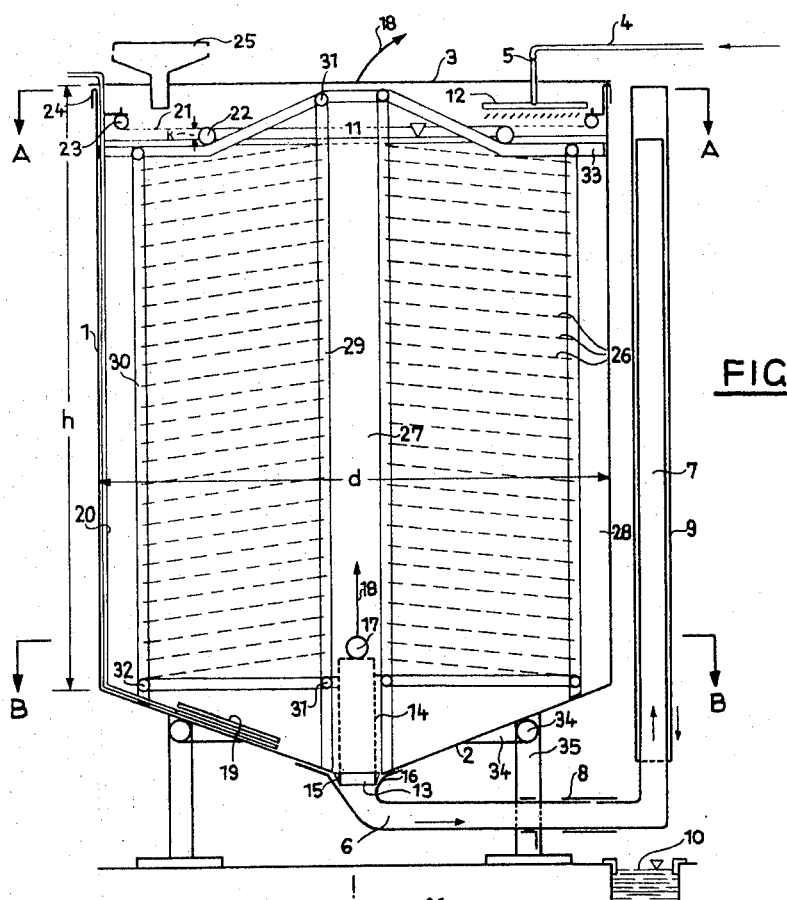
FIG. 1 is a vertical section through a high silo-like multi-story fish growing tank, FIG. 2 a sectional view along line A—A in the left half and along line B—B in the right half of FIG. 1, FIG. 3 in a larger scale a longitudinal side view of the discharge channel 10 shown in FIG. 1 and 2 and FIG. 4 a top view to FIG. 3.

In the drawing the invention is illustrated in connection with containers of typical silo shape, i.e., containers having a ratio height $h$ to diameter $d$ larger one: $h/d>1$; however, the invention is useful also in connection with containers of other shape, e.g., flat containers like swimming pools and containers of other than circular base.

Figure 2:
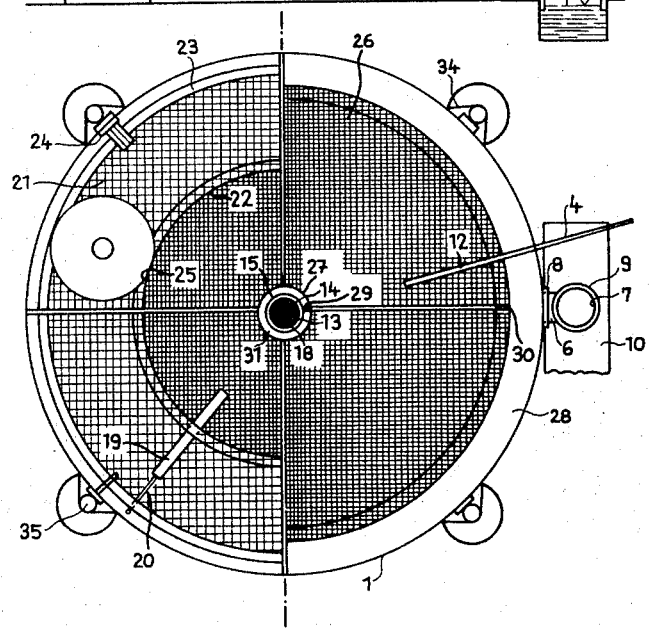

The silo-like growing tank shown in FIG. 1 and 2 consists of a circular container or tank 1 including a conical bottom 2 and a flat removable cover 3, a water supply pipe 4 with a shutoff valve 5 and a water evacuation pipe 6 connected to an overflow 7 consisting of a stand pipe which is surrounded by a down-pipe 9 and is slewable together with said down-pipe around a horizontal sleeve bearing 8. The lower end of the down-pipe expells water into a discharge channel 10. The water level 11 may be lowered at will be throwing the overflow 7 to a complete evacuation of the tank 1.

A sprinkler 12 the radiation of which is adjustable in a circumferential or tangential direction inclined against the water level 11 is connected to the water supply pipe 4. By changing the inclination of radiation a more or less rapid circular flow of water may be obtained which in connection with the flow from the water level 11 to the evacuation pipe 6 gives a helical or spiral flow from the water level 11 towards the bottom 2.

The water evacuation pipe 6 is connected to an evacuation hole 13 in the center of the conical bottom 2. This evacuation hole 13 is screened towards the inside of the tank by a removable or switchable circular cylindrical latticed dome 14. In the closed position said dome prevents fish from passing the evacuation hole 13 whereas water may pass it essentially without any remarcable resistance. The dome 14 is so high that a free evacuation of water is given even if it is surrounded by a large gathering of fish all around the dome and by deposits like dung, mud, feed-residues, dead fish etc. adjacent the bottom 2 up to a height equal to the thickness of the deposit layer. The edge 15 of the opening of said dome 14 is made conically and the evacuation hole 13 is provided with a conical seat 16 for edge 15. A rope 18 is fixed to an ear 17 at the top side of dome 14 by which the dome 14 may be lifted to evacuate the tank. Then fish, dung, mud and feed-residues are washed out through the evacuation pipe 6, overflow 7 and down-pipe 9 into the discharge channel 10 which are made with a width which is sufficient to allow the fish to pass.

Aeration is performed firstly by the sprinkler 12 carrying along air from the free atmosphere and secondly by conventional aeration means 19 including an air hose 20.

A flat annular latticed feed table 21 is provided concentrically to the axis of the tank in a preselected free distance above the water level 11 which is supported by an annular swimmer 22 and at its periphery is connected to a holder 23 at which are fixed clamps 24 which are shiftable at the edge of the tank 1. The feed table 21 thus is turnable around the axis of the tank in order to facilitate an even distribution of feed over the circumference of the feed table. Such a feed table is suitable, e.g., for feeding trout. The trout may jump from the water upon the feed table, or, alternatively, may jump from the water and take food through the openings in the feed table. For other fish a feed automaton with feeding hopper 25 may be provided.

The fish growing tank may be divided in several floors by the insertion of intermediate bottoms 26 for holding bottom fish or other at the bottom living fish like trout and flatfish. Such floors 26 preferably consist of lattices and may be formed from plastic-coated screen-wire. The floors 26 are formed conically sloping from their inside edge to their outside edge so that with help of the downwards directed flow of water all floors 26 are automatically cleaned from dung, mud, feed residues and dead fish.

The floors 26 inside and outside border on wells which extend from the bottom 2 to the water level 11 namely a central well 27 and a jacket like well 28. The central well 27 is so wide or spacious that it surrounds the dome 14 with sufficient distance to allow fish to pass. Especially dead fish will rise upwards to the water level 11 and thus cannot rot below the undermost floor. Dead fish lying at the bottom may also be washed away by briefly lifting the dome 14. The distance of the outer edges of all floors 14 may be large enough to allow an easy fish passage from the floors 26 to the feed table 21 and vice versa. The floors 26 are supported by an insert which consists essentially of posts 29, 30, rings 31, 32 and centering arms 33.

The tank 1 is supported by a supporting frame 34 with legs 35. A sorting means 36 is provided within discharge channel 10 and consists of an overflow channel with weir 37 with several sorting chambers separated from one another by perforated partition walls 38, namely a first sorting chamber 39 for fish of smallest size, a second sorting chamber 40 for a middle size, a third sorting chamber 41 for an upper size and a last sorting chamber 42 for fish of oversize. The chambers 39, 40, 41 are covered by separately removable sorting grids 43, 44, 45. The fish is supplied by a perforated feeding slide 46 to the first sorting grid 43. The water level 47 within the overflow channel is adjusted by weir 37 in such a manner that the depth of water above the sorting grids increases from a low value of, e.g., 0,5 cm above sorting grid 43 to 2,0 cm above grid 45.

Many modifications and other embodiments are possible within the scope of the invention. The tank may be used for fish of different sort by help of the removable insert of floors, namely for fish which moves freely within the space of water with the floors removed and for bottom fish with inserted floors. The support for the floors may be made as a stand as is shown in the drawing but could also be suspended or consist of a swimming construction. The height of the floors preferably is adjustable continuously or stepwise in order to accommodate it to the respective sort of fish. The arrangement of floors yields an essential increase of capacity per cubic metre water volume, combined with low expenses for maintenance by automatic cleaning procedure and full or semiautomatic feeding. Corrosion may be avoided by applying plastic coatings. An essential further advantage of the new fish growing tank is that it can be placed freely, that it is transportable and may be used as a profitable additional equipment in many sorts of works, e.g., industrial plants using cooling water, in biological purification plants, agricultural equipments, hotels and restaurants. The application in biological purification plants has the advantage that an essential part of the expenses for purification may be recovered by utilization of the purified water for fish growing according to the invention.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

What I claim is:

1. A fish growing tank comprising means defining a tank with a nominal water level, means for water supply to the tank,
    means for evacuation of water comprising an adjustable overflow conduit connected to an evacuation hole in the bottom of the tank, and
    means defining a latticed dome having a height greater than the span across it located in the bottom of the tank with its top terminating substantially below said nominal water level height.

2. Tank in accordance with claim 1, wherein said dome is movable away from said evacuation hole and wherein said water evacuation hole and the evacuation pipe connected to it are sufficiently wide to allow the fish to pass therethrough.

3. Tank in accordance with claim 1 wherein a latticed feed-table is provided in a preselected free distance above said water level.

4. Tank in accordance with claim 3 wherein said feed-table is supported by swimmers.

5. Tank in accordance with claim 1 wherein a plurality of replaceable floors are provided in a height array within the tank.

6. Tank in accordance with claim 5 wherein said floors consist of gratings.

7. Tank in accordance with claim 5 wherein at least one well which extends from the bottom of the tank to the water level in it is defined by said tank and floors and is open for passage of fish from said floors.

8. Tank in accordance with claim 7 wherein said floors slope into said at least one well.

9. Tank in accordance with claim 7 wherein at least one of said wells is provided above said evacuating hole and surrounding said dome.

10. Tank in accordance with claim 7 wherein at least one of said wells is annular and surrounds said floors like a jacket.

11. Tank in accordance with claim 1 wherein said adjustable overflow consists of a pipe which is swivellable around a lower end thereof and further comprising means defining an evacuation channel for receiving discharges from the pipe.

12. Tank in accordance with claim 11 wherein said overflow pipe is surrounded by a down-pipe.

13. A fish growing tank comprising means defining a tank with a nominal water level, means for water supply to the tank,
- means for evacuation of water comprising an adjustable overflow conduit connected to an evacuation hole in the bottom of the tank, and
- means defining a latticed dome located in the bottom of the tank with its top terminating substantially below said nominal water level height, and
- sorting means within the evacuation channel consisting of a step grate with stepwise increasing widths and separated chambers for stepwise retaining fish of increasing size.

14. A fish growing tank comprising means defining a tank with a nominal water level,
- means for water supply to the tank,
- means for evacuation of water from the tank,
- and a plurality of replaceable floors in said tank stacked one above the other to comprise a multistory fish growing tank for increasing the utilization of the water volume in said tank,
- said tank and floors coacting to define well means extending from the bottom of the tank to the water level in it for passage of fish from said floors,
- the cross sectional area of each floor being greater than that of said well means and less than that of said tank.

15. A fish growing tank in accordance with claim 14 wherein said floors slope into said well means.

* * * * *